(12) United States Patent
Cutsforth

(10) Patent No.: US 9,874,492 B2
(45) Date of Patent: Jan. 23, 2018

(54) BRUSH HOLDER MARKING SYSTEM AND ASSOCIATED MAINTENANCE

(71) Applicant: Cutsforth, Inc., Cohasset, MN (US)

(72) Inventor: Robert S. Cutsforth, Bellingham, WA (US)

(73) Assignee: CUTSFORTH, INC., Cohasset, MN (US)

(*) Notice: Subject to any disclaimer, the term of this patent is extended or adjusted under 35 U.S.C. 154(b) by 392 days.

(21) Appl. No.: 14/755,844

(22) Filed: Jun. 30, 2015

(65) Prior Publication Data

US 2015/0300915 A1    Oct. 22, 2015

Related U.S. Application Data

(63) Continuation of application No. 13/419,737, filed on Mar. 14, 2012, now Pat. No. 9,099,827.

(51) Int. Cl.

| | | |
|---|---|---|
| *H01R 39/58* | (2006.01) | |
| *G01M 13/00* | (2006.01) | |
| *H01R 39/41* | (2006.01) | |
| *B41G 7/00* | (2006.01) | |
| *G01B 11/00* | (2006.01) | |
| *H02K 13/00* | (2006.01) | |

(52) U.S. Cl.
CPC ............... *G01M 13/00* (2013.01); *B41G 7/00* (2013.01); *G01B 11/00* (2013.01); *H01R 39/41* (2013.01); *H01R 39/58* (2013.01); *H02K 13/00* (2013.01)

(58) Field of Classification Search
CPC ........ H02K 11/20; H02K 13/00; H01R 39/58; H01R 43/14
See application file for complete search history.

(56) References Cited

U.S. PATENT DOCUMENTS

| | | |
|---|---|---|
| 4,347,455 A | 8/1982 | Major et al. |
| 4,355,254 A | 10/1982 | Oki et al. |
| 5,708,317 A | 1/1998 | Siegel et al. |
| 7,034,430 B2 | 4/2006 | Custforth et al. |
| 7,045,929 B2 | 5/2006 | Yu |
| 7,122,935 B2 | 10/2006 | Custforth et al. |
| 7,141,906 B2 | 11/2006 | Custforth et al. |
| 7,365,470 B1 | 4/2008 | Eger et al. |
| 7,417,354 B2 | 8/2008 | Cutsforth et al. |
| 7,545,072 B2 | 6/2009 | Cutsforth |
| 7,564,160 B2 | 7/2009 | Cutsforth et al. |
| 7,705,744 B2 * | 4/2010 | Cutsforth ........... G05B 23/0232 340/648 |
| 7,768,174 B2 | 8/2010 | Cutsforth et al. |
| 7,816,834 B2 | 10/2010 | Cutsforth |
| 7,880,362 B2 | 2/2011 | Cutsforth et al. |
| 7,880,363 B2 | 2/2011 | Cutsforth et al. |

(Continued)

FOREIGN PATENT DOCUMENTS

JP    2000014092 A    1/2000

*Primary Examiner* — Dang Le
(74) *Attorney, Agent, or Firm* — Seager, Tufte & Wickhem LLP

(57) ABSTRACT

A marking system for knowing precisely at which location on an electrical device a used brush and associated brush holder assembly were positioned to evaluate whether abnormal brush wear, abnormal operation or other anomaly is occurring and performing maintenance and/or replacement of components as needed.

15 Claims, 14 Drawing Sheets

(56) References Cited

U.S. PATENT DOCUMENTS

| | | |
|---|---|---|
| 7,916,038 B2 * | 3/2011 | Cutsforth .......... G05B 23/0232 340/648 |
| 7,960,892 B2 | 6/2011 | Cutsforth |
| 7,990,018 B2 | 8/2011 | Cutsforth et al. |
| 7,994,683 B2 | 8/2011 | Cutsforth et al. |
| 8,134,472 B2 | 3/2012 | Cutsforth |
| 8,179,014 B2 | 5/2012 | Cutsforth et al. |
| 8,384,266 B2 | 2/2013 | Fish et al. |
| 8,836,197 B2 | 9/2014 | Fish et al. |
| 8,972,219 B2 * | 3/2015 | Schieke ................ H01R 39/58 180/65.1 |
| 9,013,087 B2 | 4/2015 | Fish et al. |
| 2007/0182272 A1 | 8/2007 | Kume |
| 2008/0291273 A1 | 11/2008 | Cutsforth et al. |
| 2013/0244451 A1 * | 9/2013 | Cutsforth .............. H01R 39/41 439/29 |
| 2014/0009142 A1 | 1/2014 | Cauwenberghs |
| 2014/0125206 A1 | 5/2014 | Fish et al. |
| 2017/0133807 A1 * | 5/2017 | Cutsforth .............. H01R 39/58 |

* cited by examiner

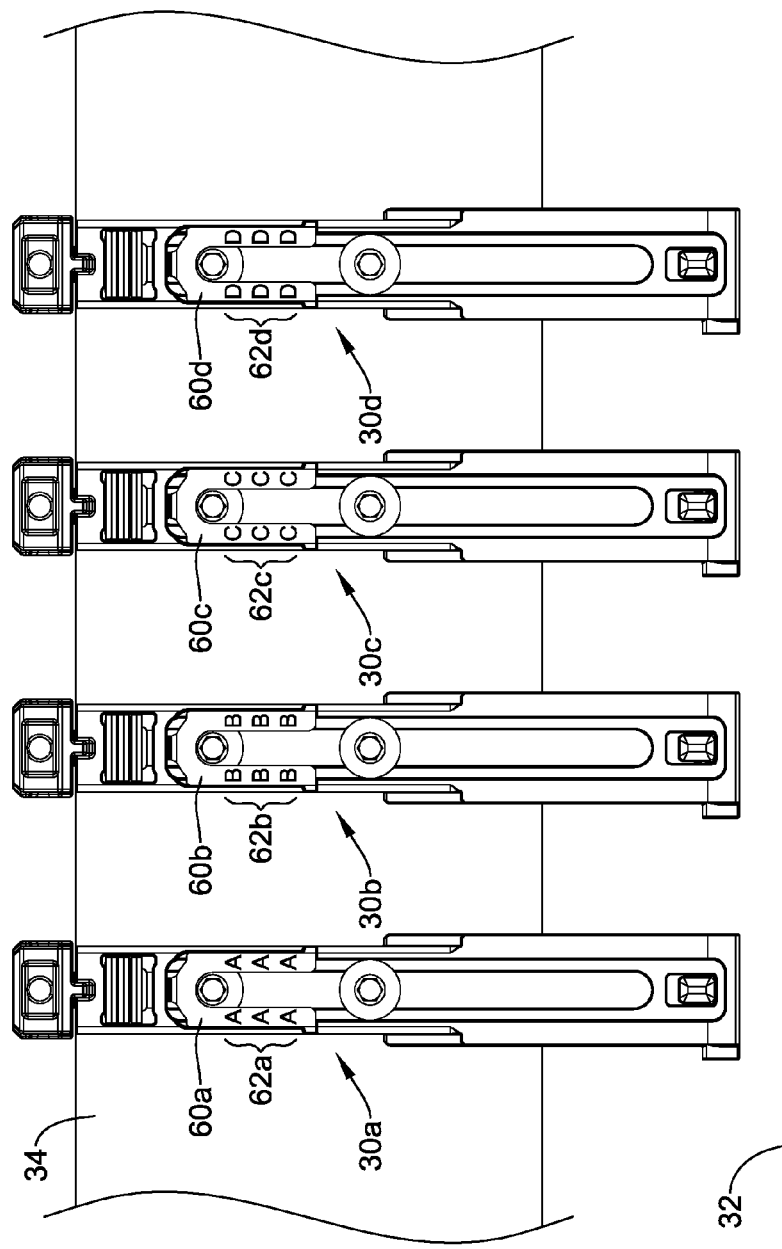

BRUSH HOLDER MARKING SYSTEM AND ASSOCIATED MAINTENANCE

CROSS-REFERENCE TO RELATED APPLICATION

This application is a continuation of U.S. patent application Ser. No. 13/419,737, filed on Mar. 14, 2012, the contents of which are fully incorporated herein by reference.

TECHNICAL FIELD

The disclosure is directed to a brush holder marking system for a brush holder assembly of an electrical device. More particularly, the disclosure is directed to a marking system for knowing precisely at which location on the electrical device a used brush and brush holder were positioned to evaluate whether abnormal operation or other anomaly is occurring and performing maintenance and/or replacement of components as needed.

BACKGROUND

A purpose of a brush in an electrical device is to pass electrical current from a stationary contact to a moving contact surface, or vice versa. Brushes and brush holders may be used in electrical devices such as electrical generators, electrical motors, and/or slip ring assemblies, or sliding connection applications, for example, slip ring assemblies on a rotating machine such as a rotating crane or a linear sliding connection on a monorail. Brushes in many electrical devices are blocks or other structures made of conductive material, such as graphite, carbon graphite, electrographite, metal graphite, or the like, that are adapted for contact with a conductive surface or surfaces to pass electrical current. Electrically conductive leads or shunts extend from the brush to provide an electrical pathway to and/or from the brush from another conductive member.

In some designs, a brush box type brush holder, or other type of brush holder, may be used to support the brush during operation. The brush and brush box may be designed such that the brush can slide within the brush box to provide for continuing contact between the brush and the conductive surface contacted by the brush. Over time, the brush will be reduced in size, or get shorter (i.e., diminish in longitudinal length), for example, as the wear surface of the brush in frictional contact with the conductive surface wears down. Once a brush has worn beyond a threshold amount, a brush may need to be replaced and/or maintenance may need to be performed.

Accordingly, it is desirable to provide a means of servicing brush holder assemblies and replacing brushes and/or brush holders, while knowing precisely at which location on the electrical device the used brush and brush holder were positioned to evaluate whether abnormal operation or other anomaly is occurring.

SUMMARY

The disclosure is directed to several alternative designs, materials and methods of manufacturing brush holder structures and assemblies, and uses thereof.

Accordingly, one illustrative embodiment is a brush holder apparatus for maintaining a brush in contact with a conductive surface of an electrical device. The brush holder apparatus includes a mounting member configured to be mounted to a stationary base of the electrical device, and a brush holder assembly configured to be removable from the mounting member. The mounting member includes a marker having marking indicia thereon. The brush holder assembly includes a brush holder for holding a brush and an imprintable material layer. The brush holder assembly is configured to be removable from the mounting member, such that in a first position the brush holder assembly is disengaged from the mounting member and in a second position the brush holder assembly is engaged with the mounting member. In the engaged position the marking indicia of the marker presses against the imprintable material layer of the brush holder assembly to leave an imprinted indicia on the imprintable material layer.

Another illustrative embodiment is an electrical device including a plurality of mounting members and a plurality of corresponding brush holder assemblies. Each of the plurality of mounting members are secured to a stationary structure of the electrical device. Each of the plurality of mounting members includes a marker having a marking indicia unique to the other markers of the plurality of mounting members. Each of the plurality of brush holder assemblies is removably mountable to one of the plurality of mounting members. A brush holder assembly is marked with the marking indicia of a corresponding one of the markers when the brush holder assembly is mounted to the associated mounting member.

Yet another illustrative embodiment is a method of determining a location on an electrical device from which a brush holder assembly was removed from. The method includes mounting a brush holder assembly to a mounting member secured to a stationary structure of the electrical device. Marking indicia is imprinted on the brush holder assembly with a marker of the mounting member as the brush holder assembly is mounted to the mounting member. Thereafter, the brush holder assembly is removed from the mounting member, wherein the marking indicia on the brush holder assembly indicates the location on the electrical device from which the brush holder assembly was removed from.

The above summary of some example embodiments is not intended to describe each disclosed embodiment or every implementation of the aspects of the disclosure.

BRIEF DESCRIPTION OF THE DRAWINGS

The aspects of the disclosure may be more completely understood in consideration of the following detailed description of various embodiments in connection with the accompanying drawings, in which:

FIGS. 11A and 11B illustrate an exemplary bus of mounting blocks and brush holder assemblies of an electrical device utilizing a unique identification system to reference a position of a brush holder and associated brush on an electrical device.

Figure 1:
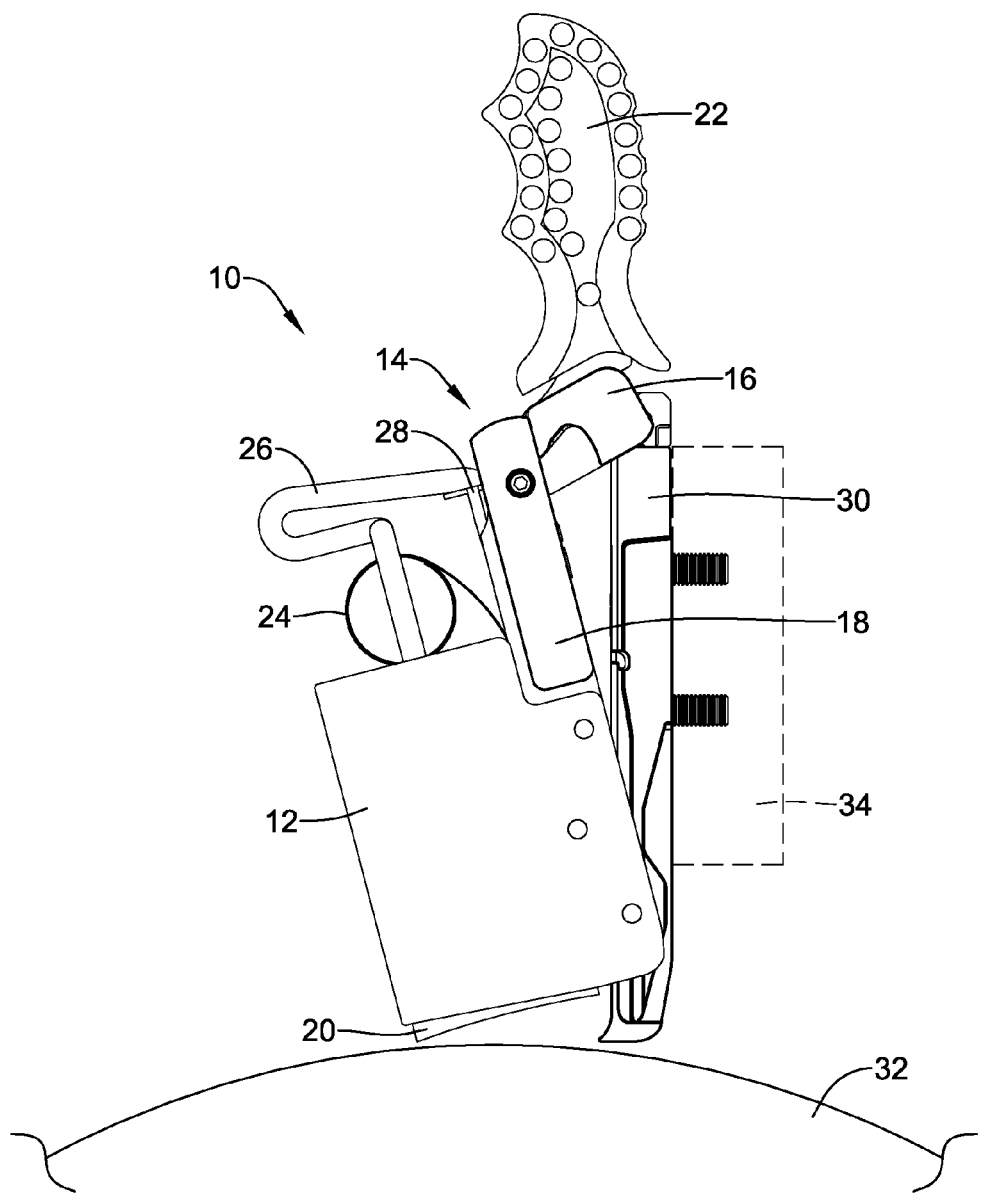
FIG. 1 is a side view of an exemplary brush holder assembly in a disengaged position.

While the aspects of the disclosure are amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions, ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

A brush holder assembly 10, for example as shown in FIG. 1, may include a brush holder 12, such as a brush box, surrounding a brush 20 on several sides and including a plurality of guiding surfaces for guiding linear or longitudinal movement of the brush 20. In some embodiments, the brush holder 12 may not take on the form of a box, but may include one or a plurality of guiding surfaces, such as channels, posts or columns, abutting and/or encompassing one or more sides of the brush 20 and/or extending into or through the brush 20, or a portion thereof, for guiding linear or longitudinal movement of the brush 20.

The brush holder assembly 10 may be configured to be removably mounted to a mounting structure. For example, the brush holder 12 may be secured to a mounting beam 14 configured and adapted to be mounted to another structure, such as a mounting member which in turn is mounted to a stationary structure of the electrical device. One illustrative mounting member to which the brush holder assembly 10 may be removably mounted to is depicted as a mounting block 30. The brush holder assembly 10 is configured to place the brush 20 in contact with a conductive surface 32, such as a rotating surface of a collector ring, a slip ring, or a commutator, and conduct current therefrom. The brush 20 may extend from the lower edge of the brush holder 12 such that a wear surface of the brush 20 engages the conductive surface 32. The mounting beam 14 may include an over-center engagement mechanism, a slotted or channeled engagement mechanism for sliding engagement, or other mechanism for easily engaging and disengaging the brush 20 from a conductive surface 32.

In some embodiments, the brush holder assembly 10 may substantially resemble a brush holder assembly as described in U.S. Pat. No. 7,034,430, entitled "Brush Holder Apparatus, Brush Assembly, and Method", which is herein incorporated by reference in its entirety. In other embodiments, the brush holder assembly may include a brush holder rigidly mounted to another structure holding the brush holder stationary, or mounted to another structure in any desired arrangement. For example, in some embodiments the brush holder may be bolted or welded to a stationary structure. Some such brush holders are disclosed in U.S. Pat. Nos. 6,731,042; 5,753,992; 5,621,262; 5,463,264; 5,397,952; and 5,256,925; which are incorporated herein by reference.

Figure 2:
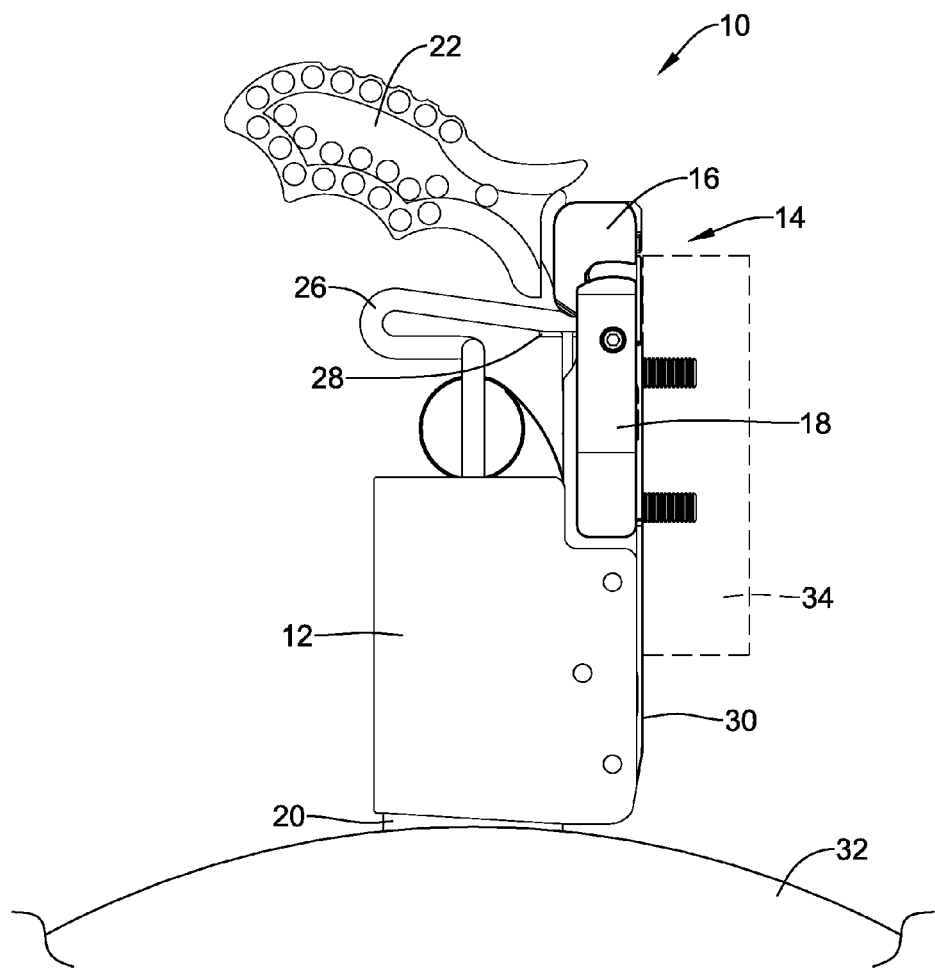
FIG. 2 is a side view of the exemplary brush holder assembly of FIG. 1 in an engaged position.

As shown in FIG. 1, the mounting beam 14 may include an upper beam member 16 and a lower beam member 18 hingedly or pivotably coupled to one another at a pivot point. As shown in FIG. 1, when the upper beam member 16 is tilted from the lower beam member 18 (e.g., the longitudinal axis of the upper beam member 16 is oblique to the longitudinal axis of the lower beam member 18), the brush holder 12 may be considered to be in a disengaged, or unlocked, position such that the brush 20 may be non-contiguous with, spaced from, or otherwise not in direct electrical contact with the conductive surface 32. As shown in FIG. 2, when the upper beam member 16 and the lower beam member 18 are aligned with one another (e.g., the longitudinal axis of the upper beam member 16 is generally parallel with the longitudinal axis of the lower beam member 18), the brush holder 12 may be considered to be in an engaged, or locked, position such that the brush 20 may be contiguous with or in contact with the conductive surface 32.

The mounting beam 14 may be removably coupled to the mounting block 30 during operation to couple the brush holder 12 to the mounting block 30. In some embodiments, the mounting beam 14 may slidably engage with, interlock with, or otherwise be removably coupled to the mounting block 30. The mounting block 30 may be coupled to, secured to, or otherwise extend from another structure which maintains the mounting block 30 stationary with respect to the conductive surface 32, for example. For example, the mounting block 30 may be secured (e.g., bolted, welded) to a yoke or other stationary structure 34 of the electrical device.

In some embodiments, a handle 22 may be attached to the brush holder 12 to facilitate engagement and disengagement of the brush 20 from the conductive surface 32. For example, the handle 22 may be attached to the upper beam member 16 such that movement of the handle 22 actuates (e.g., pivots, slides, releases) the upper beam member 16 relative to the lower beam member 18 between the disengaged position (FIG. 1) and engaged position (FIG. 2). The handle 22 may be a removable handle or the handle 22 may be permanently attached to the upper beam member 16 or another portion of the brush holder 12.

Also illustrated in FIG. 1 is a brush spring 24, such as a constant force spring, which provides tension to the brush 20 to bias the brush 20 toward and in contact with the conductive surface 32. The spring 24 may be attached to a portion of the brush holder 12 or the mounting beam 14 of the brush holder assembly 10, for example. In some embodiments, the spring 24 may extend along one side surface of the brush 20 between the brush 20 and the mounting beam 14 of the brush holder assembly 10.

The brush 20 may include one or more electrical leads (e.g., shunts) 26 for conducting electricity to and/or from the electrically conductive surface 32 through the brush 20. For example, first and second electrical leads 26 may extend from the brush 20 to an electrically conductive terminal 28 coupled to a component of the brush holder assembly 10, such as the mounting beam 14. The ends of the leads 26 may be soldered, brazed, crimped, clamped or otherwise removably or permanently secured to the terminal 28. In some instances, the terminal 28 may be formed of copper or other electrically conductive material.

Figure 3:
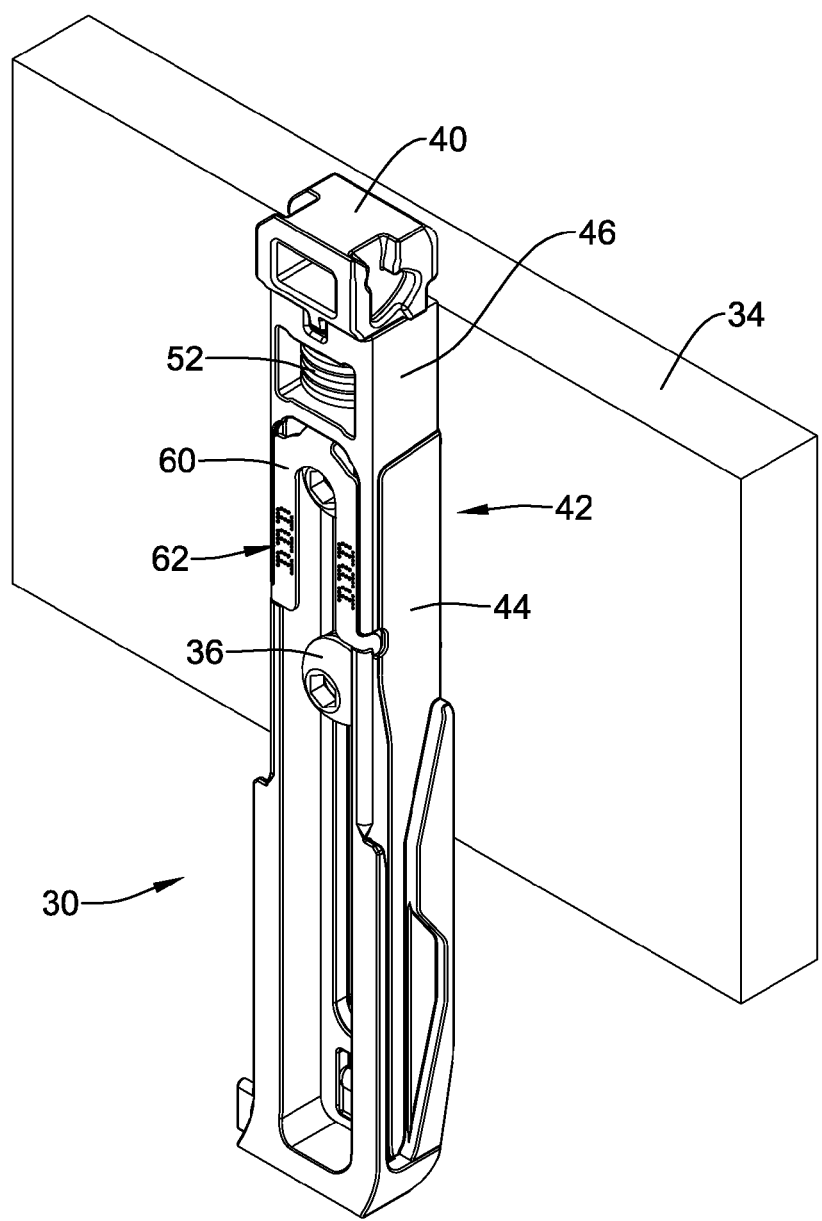
FIG. 3 is a perspective view of an exemplary mounting block of a brush holder assembly mounted to a stationary structure of an electrical device.
Figure 4:
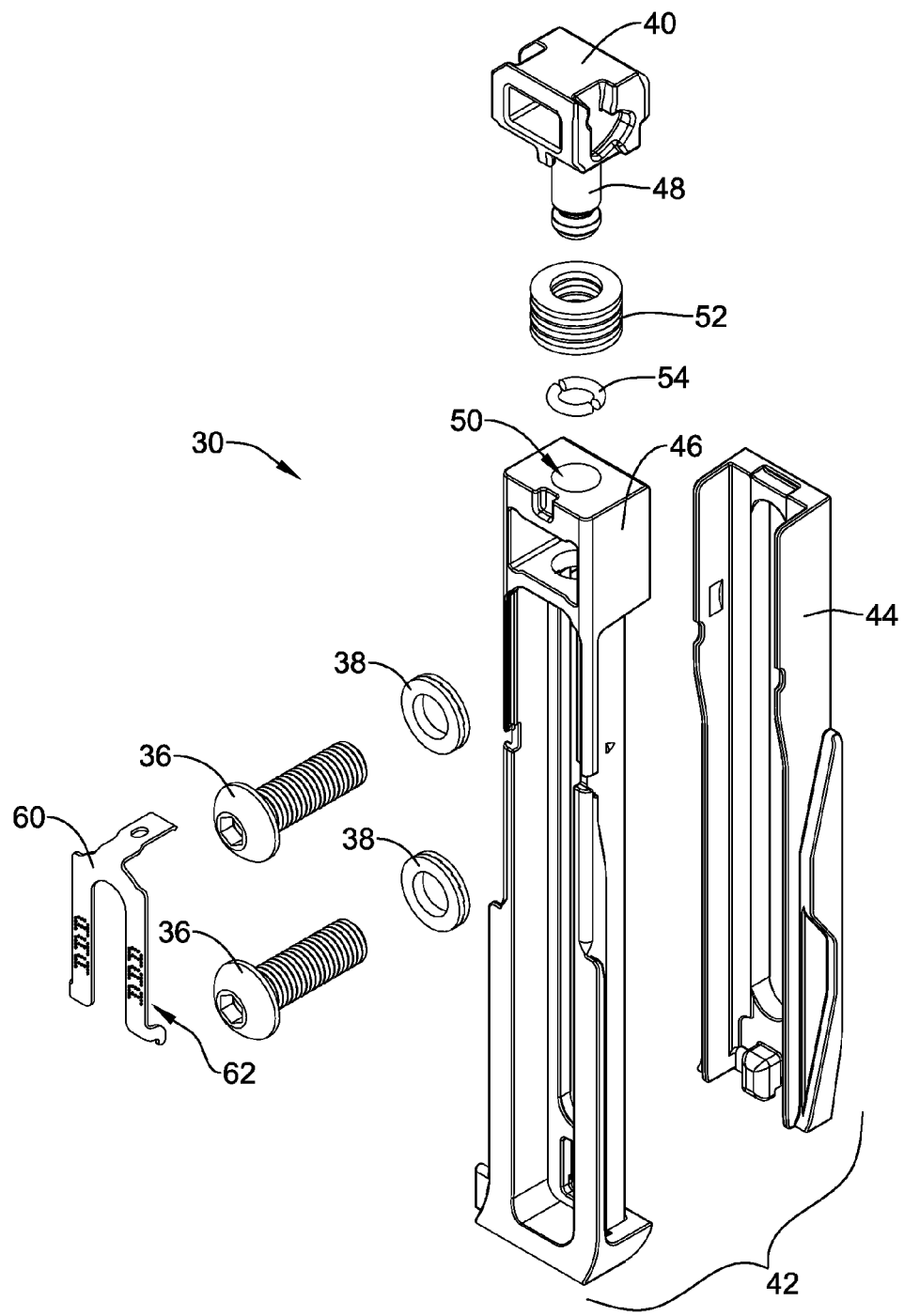
FIG. 4 is an exploded view of the exemplary mounting block of FIG. 3.

Turning to FIGS. 3 and 4, the mounting block 30 is further described. The mounting block 30 may be secured to a stationary structure or yoke 34 such that a rear side of the mounting block 30 is facing and/or abutting the stationary structure 34. The mounting block 30 may be secured to the stationary structure or yoke 34 of the electrical device by any desired means, such as welding, bolting, etc. In the illustrative embodiment, bolts 36 and washers 38 may be used to bolt the mounting block 30 to the yoke 34 of an electrical device.

The mounting block 30 may be formed of a single member, or the mounting block 30 may include multiple components assembled together. For example, as shown in FIG. 4, the mounting block 30 may include an upper mount 40 and a lower mount 42. The upper mount 40 may be assembled with the lower mount 42 by any desired means. For example, the upper mount 40 may include a post 48 configured to extend through an opening 50 of the lower mount 42. Furthermore, a series of washers 52 or other spacers may be used to adjust the height of the upper mount 40 relative to the lower mount 42 to position the upper mount 40 at a desired position relative to the lower mount 42 to facilitate coupling the mounting beam 14 to the mounting block 30. A fastener, such as a retaining ring 54 may be used to retain the post 48 in the opening 50 of the lower mount 42.

Furthermore, in some instances the lower mount 42 may be formed of a plurality of components assembled together. For example, in the illustrative embodiment the lower mount 42 may include a first member 44 assembled to a second member 46. Forming the lower mount 42 from a plurality of components may facilitate manufacturing the lower mount 42, in some instances. For example, the first member 44 may be formed of a first material, such as copper, and the second member 46 may be formed of a second material, such as stainless steel. Thus, the first member 44 may benefit from the electrical conductivity of the first material, such as copper, while the second member 46 may benefit from the strength of the second material, such as stainless steel, for example.

The mounting block 30 may also include a marker 60. In some instances, the marker 60 may be formed as a portion of the mounting block 30, while in other embodiments the marker 60 may be a separate component configured to be attached to the mounting block 30. For example, in the illustrative embodiment the marker 60 may be removably attached to the lower mount 42 of the mounting block 30. For instance, the marker 60 may be configured as a removable and/or replaceable clip which may be clipped to the mounting block 30, such that the marker 60 may be readily coupled and decoupled from the mounting block 30 and replaced with another marker 60, if desired. In other embodiments, the marker 60 may be attached to the mounting block 30 with a fastener, adhesive, or other fastening means, if desired.

The marker 60 may include indicia 62, such as raised letters, numbers, symbols, and/or other marking indicia providing a unique identification for the marker 60, and thus the mounting block 30. In some instances, the indicia 62 may be formed on the marker 60 using a photo chemical etching or masking technique to remove material from the marker 60 while leaving the indicia 62, thus resulting in the indicia 62 being raised from the marker 60. As described further herein, the unique identifying indicia 62 of the marker 60 may be used to identify the location on an electrical device from which a brush holder 12 has been removed from. Namely, the indicia 62 of the marker 60 may indicate which mounting block 30 of the electrical device that a brush holder assembly, e.g. a brush holder 12 and/or a brush 20 was removed from.

Figure 5:
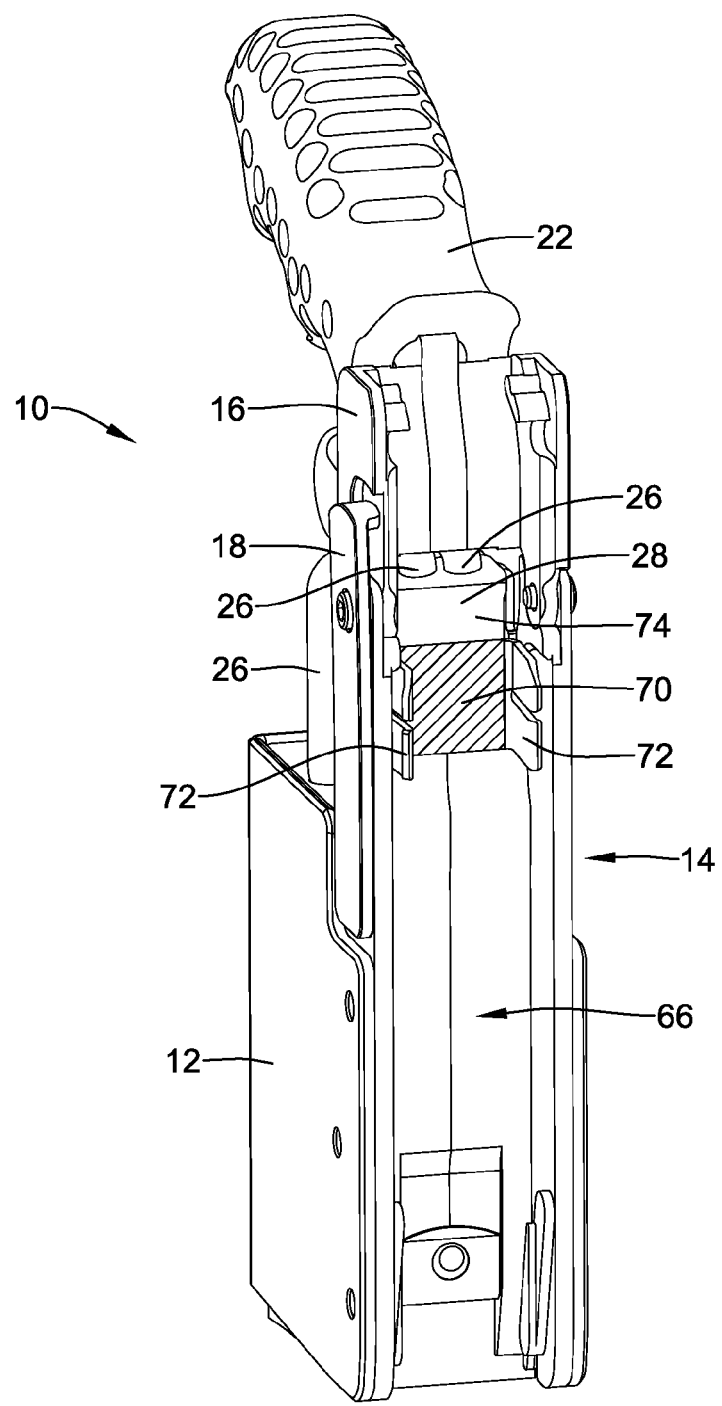
FIG. 5 is a rear perspective view of the brush holder assembly of FIGS. 1 and 2.

Features of the brush holder assembly 10 are further illustrated in FIG. 5. The mounting beam 14 may define a channel 66 within and along which the mounting block 30 is positioned when the brush holder assembly 10 is mounted to the mounting block 30. The mounting block 30 may be positioned in the channel 66 such that the mounting beam 14 surrounds and faces the mounting block 30 on at least three sides, such as opposite side surfaces and a front surface of the mounting block 30, for example.

Also shown in FIG. 5, it can be seen that when the terminal 28 is attached (e.g., removably clipped) to the mounting beam 14, a rear face 74 of the terminal 28 may face rearwardly into the channel 66 such that when the brush holder 12 is mounted to the mounting block 30, the rear face 74 of the terminal 28 faces the front surface of the mounting block 30. Furthermore, the terminal 28 may include one or more, or a plurality of tabs 72 extending from a base portion of the terminal 28 which extend into the channel 66. The tabs 72 may be configured to establish electrical contact with the mounting block 30, such as the first member 44 (which may be formed of copper or other electrically conductive material) of the mounting block 30, when the brush holder 12 is mounted to the mounting block 30 in the engaged position, shown in FIG. 2. When the brush holder 12 is moved to the disengaged position, shown in FIG. 1, the tabs 72 may be moved out of contact with the mounting block 30 (e.g., the first member 44) and thus break the electrical connection. In some instances, the tabs 72 may be positioned on opposite sides of the mounting block 30 and be resiliently deflected as the mounting block 30 is positioned in the channel 66 and between the tabs 72. Thus, the resilient forces of the tabs 72 may press the tabs 72 against the side surfaces of the mounting block 30 when in the engaged position.

Figure 6:
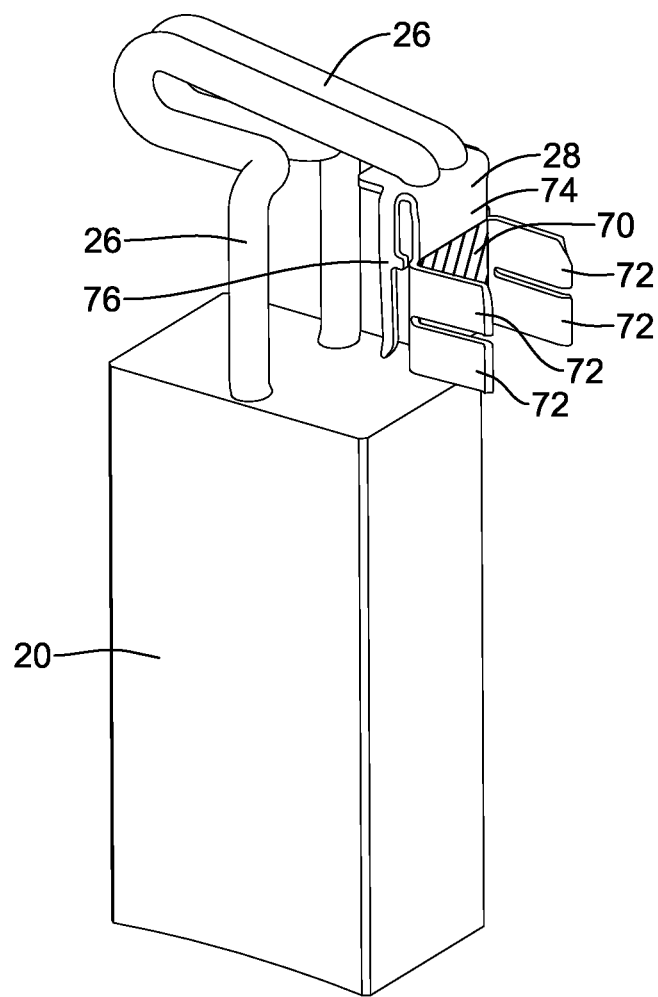
FIGS. 6 and 7 are perspective views of an exemplary brush arrangement for use with the brush holder of FIGS. 1 and 2.
Figure 7:
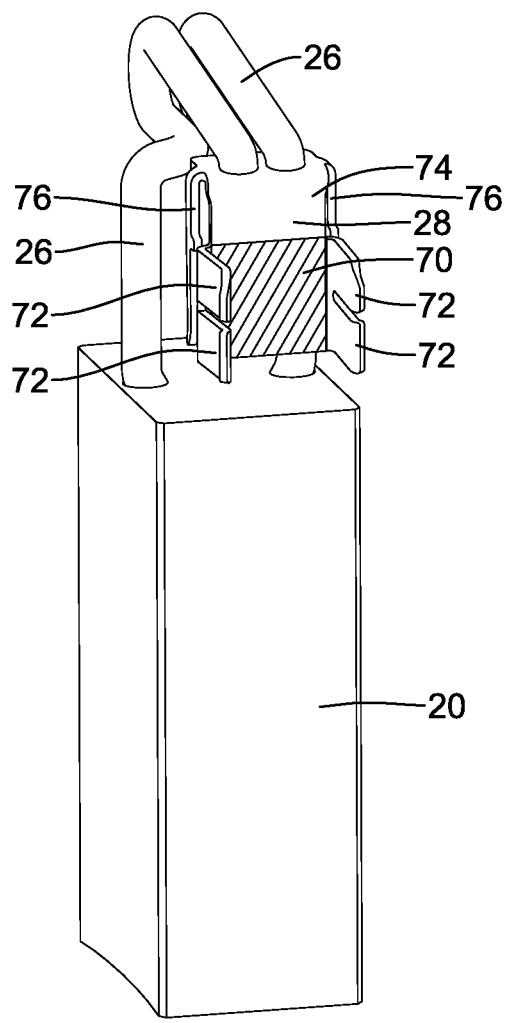

Referring to FIGS. 6 and 7, the terminal 28 may also include clips 76 configured to facilitate removably attaching the terminal 28 to the mounting beam 14 of the brush holder 12. For example, the terminal 28 may be configured to clip over an upper edge of the mounting beam 14 with the main body of the terminal 28 on one side of the mounting beam 14 and the clips 76 on an opposite side of the mounting beam 14. Thus, the terminal 28 may be readily detached from the mounting beam 14 (and thus the brush holder 12) while removing the brush 20 from the brush holder 12, and a new brush 20 with a new terminal 28 may be installed in the brush holder 12 with the new terminal 28 clipped to the mounting beam 14.

Furthermore, an imprintable material layer 70 may be positioned on the rear face 74 of the terminal 28 facing the marker 60. The imprintable material layer 70 may be any desired layer of material capable of retaining a marking or depression made by pressure. For example, in some instances the imprintable material layer 70 may be a layer of aluminum tape (e.g., foil) with an adhesive backing configured to adhere the aluminum tape to the rear face 74 of the terminal 28. One suitable aluminum tape is manufactured by 3M, of Minneapolis, Minn. In other instances, the imprintable material layer 70 may be carbon paper, a soft metal, a polymeric material, or other material suitable for receiving a mark from the marker 60. The imprintable material layer 70 may be positioned on the rear face 74 of the terminal 28 at a position aligned with the marker 60. Accordingly, when the brush holder 12 is engaged with the mounting block 30, the marker 60 may face the imprintable material layer 70, with the marking indicia 62 pressing against and/or into the imprintable material layer 70 to leave an imprint or depression on the imprintable material layer 70.

Figure 8:
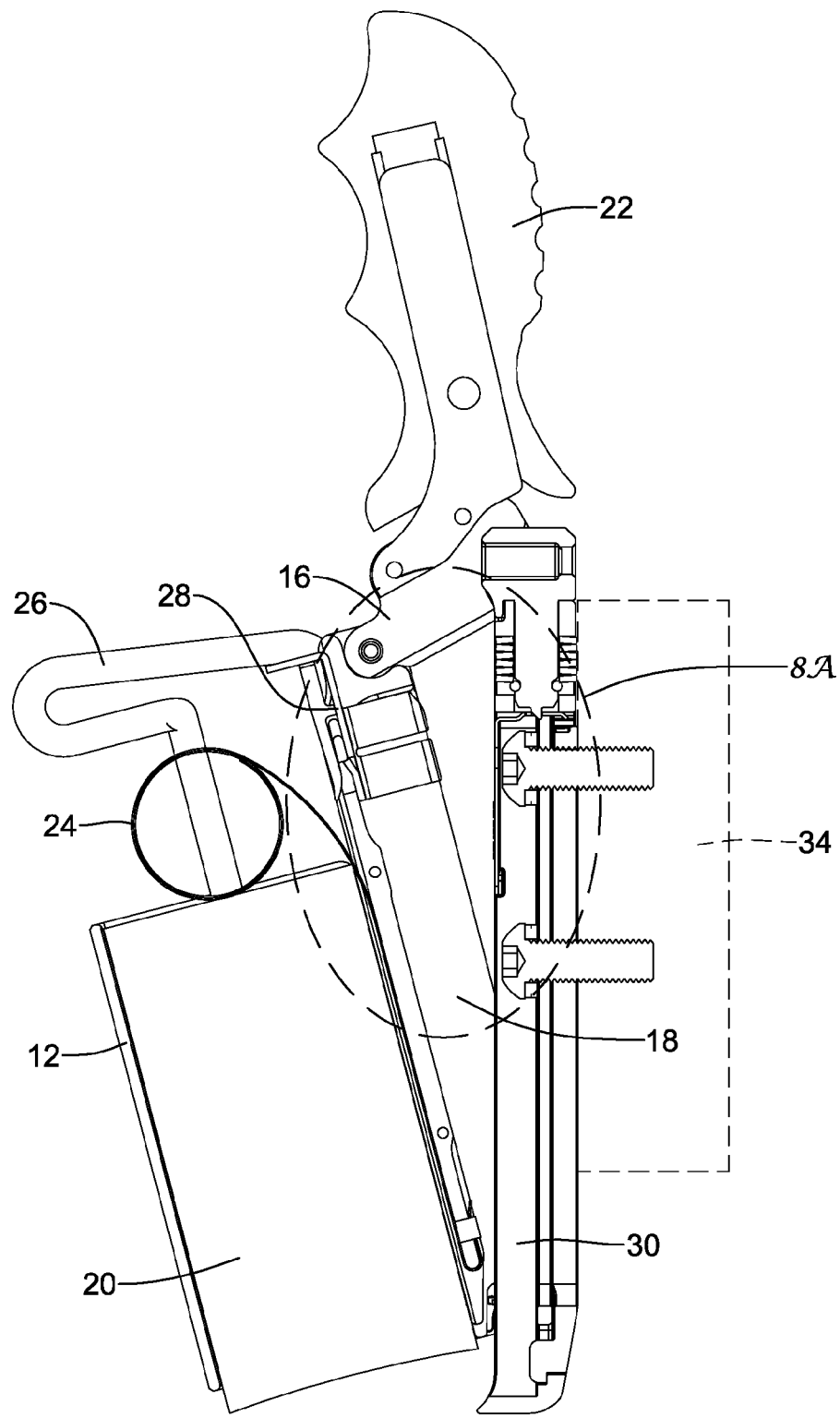
FIG. 8 is a cross-sectional view of the exemplary brush holder assembly in a disengaged position.
Figure 9:
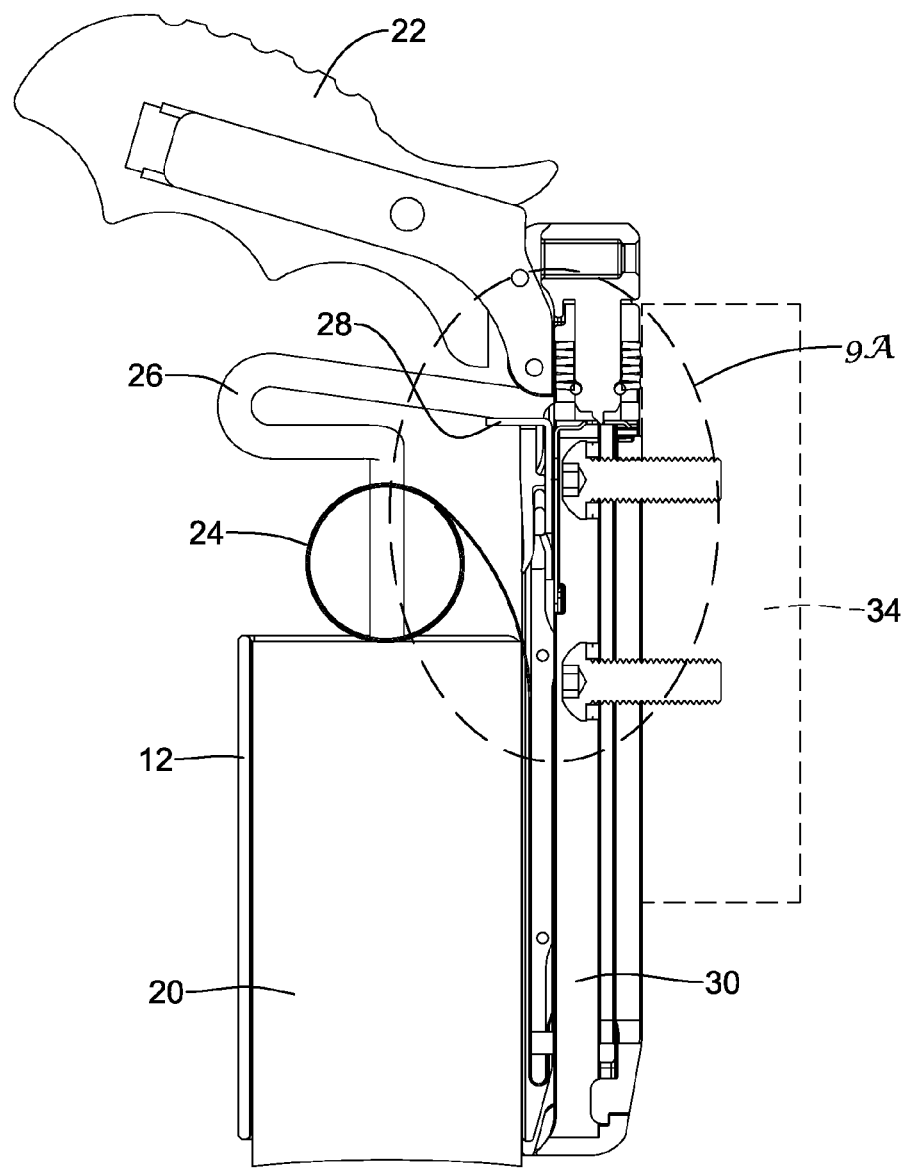
FIG. 9 is a cross-sectional view of the exemplary brush holder assembly in an engaged position.

Turning to FIGS. 8 and 9, the interaction of the marker 60 on the mounting block 30 and the imprintable material layer 70 on the terminal 28 will be further described. It is noted that the imprintable material layer 70 need not necessarily be located on the terminal 28. In other embodiments, the imprintable material layer 70 may be provided on another surface of the brush holder assembly 10 configured to face and press against the marker 60 of the mounting block 30, if desired.

Figure 8A:
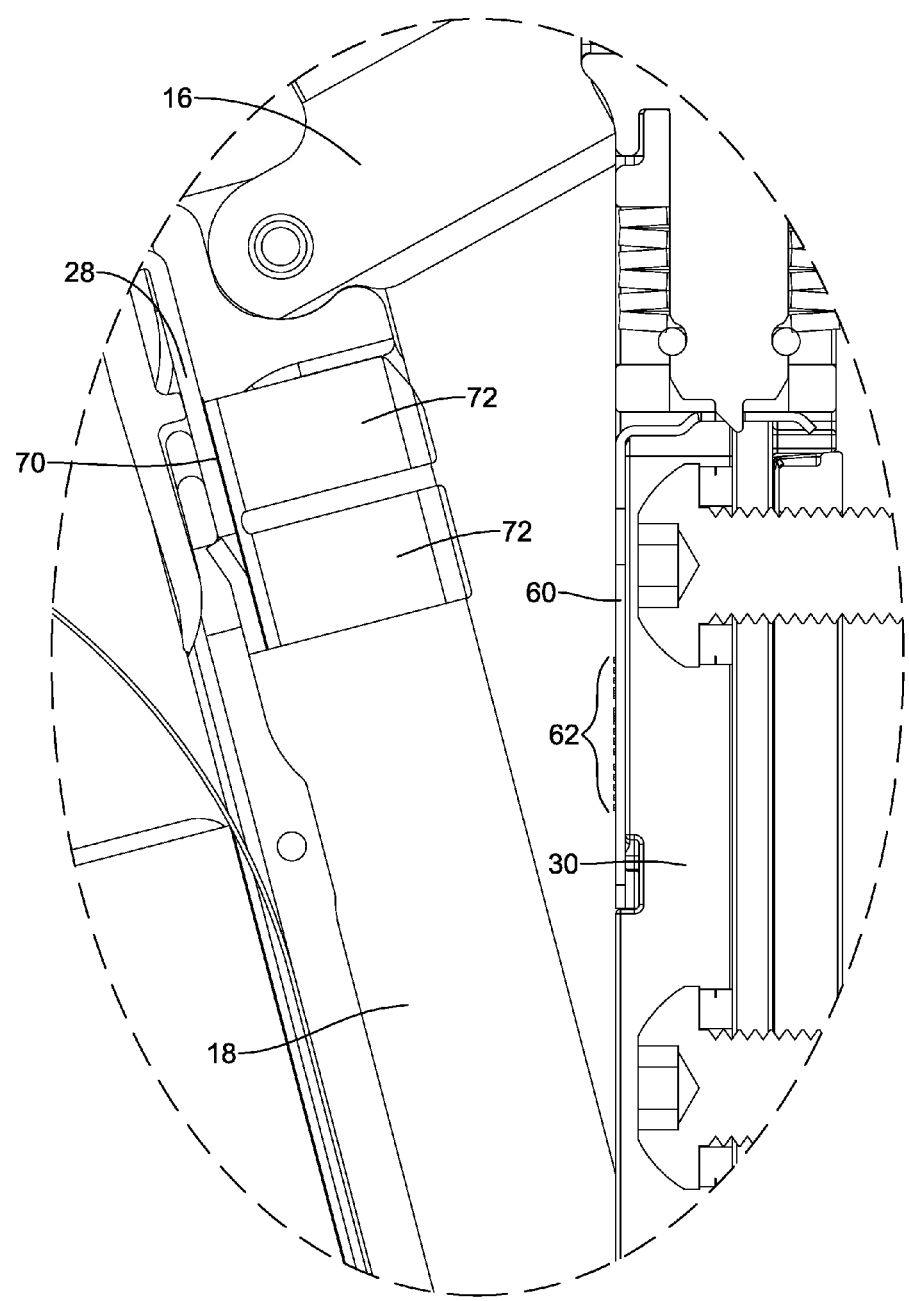
FIG. 8A is an enlarged view of a portion of FIG. 8.
Figure 9A:
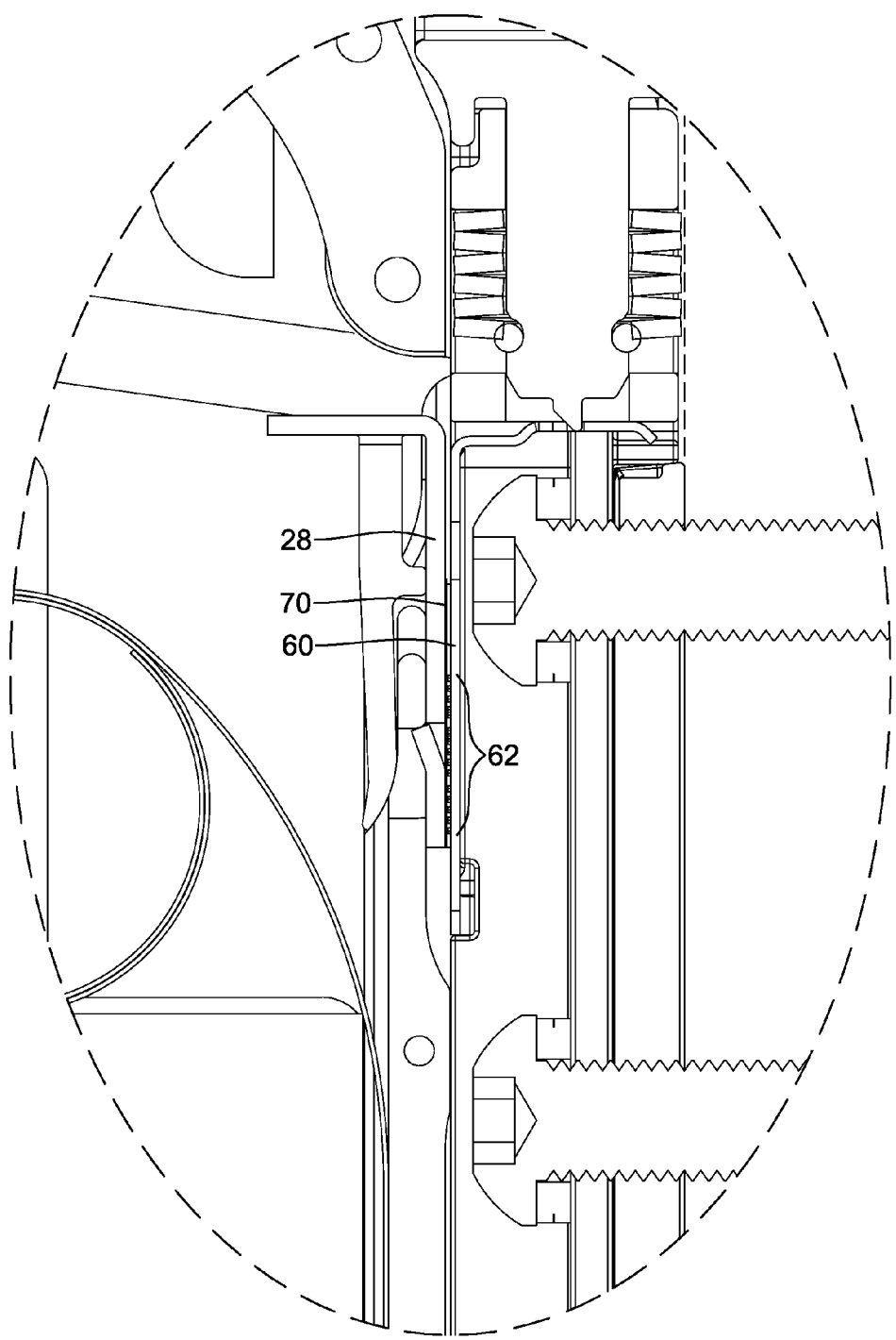
FIG. 9A is an enlarged view of a portion of FIG. 9.

As shown in FIG. 8 and accompanying FIG. 8A, when the brush holder 12 is in a disengaged position, the imprintable material layer 70 may be spaced away from the marker 60, and thus the marking indicia 62 of the marker 60. When the brush holder 12 is moved to the engaged position, shown in FIG. 9, the imprintable material layer 70 may be moved into contact with the marker 60, namely the marking indicia 62 of the marker 60 in order to make a imprint or depression in the imprintable material layer 70 of the marking indicia 62. FIG. 9A illustrates the indicia 62 of the marker 60 pressed against the imprintable material layer 70 to generate a marking thereon. It is noted that the interaction of the marker 60 and the imprintable material layer 70 may be any such that an identifiable marking is created on the imprintable material layer 70 by the marker 60.

Figure 10:
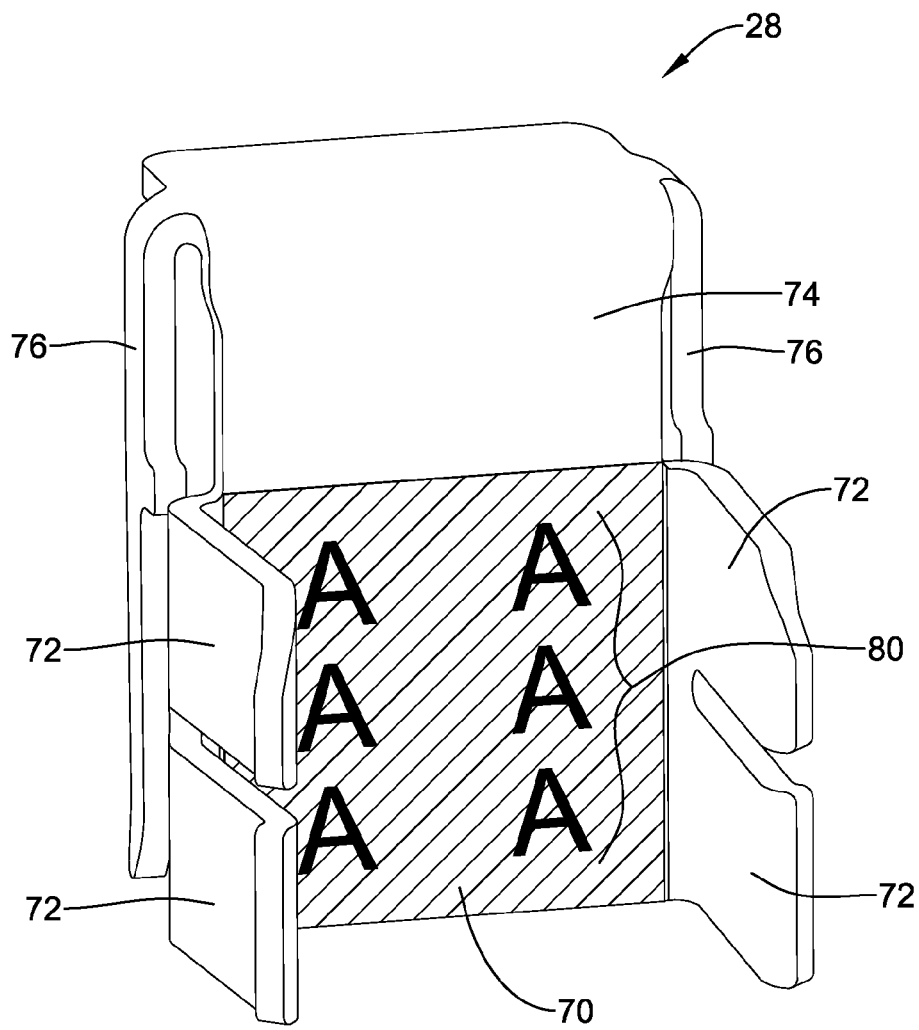
FIG. 10 is a perspective view of an exemplary terminal of a brush that has been marked for identifying reference.

FIG. 10 illustrates the terminal 28, with the imprintable material layer 70 affixed to the rear face 74 of the terminal 28. As shown in FIG. 10, the imprintable material layer 70 has been marked or imprinted with a marking 80 from the indicia 62 of the marker 60. For example, the imprintable material layer 70 may be imprinted with a marking 80, such as recessed indicia (e.g. text, numbers, symbols, etc.) pressed into the imprintable material layer 70 by the indicia 62 of the marker 60. Accordingly, when the brush holder 12, and associated brush 20 with terminal 28, are removed from the electrical device, the marking 80 on the imprintable material layer 70 may be indicative of the location (e.g., which mounting block 30) of the electrical device that the brush holder 12 and brush 20 were removed from. It is noted that in some instances, such as when text or numbers are used, the indicia 62 on the marker 60 may be a reverse image of the marking 80 that is to be generated on the imprintable material layer 70, thus generating a legible marking 80 (e.g., readable numbers and/or letters) on the imprintable material layer 70.

Figure 11B:
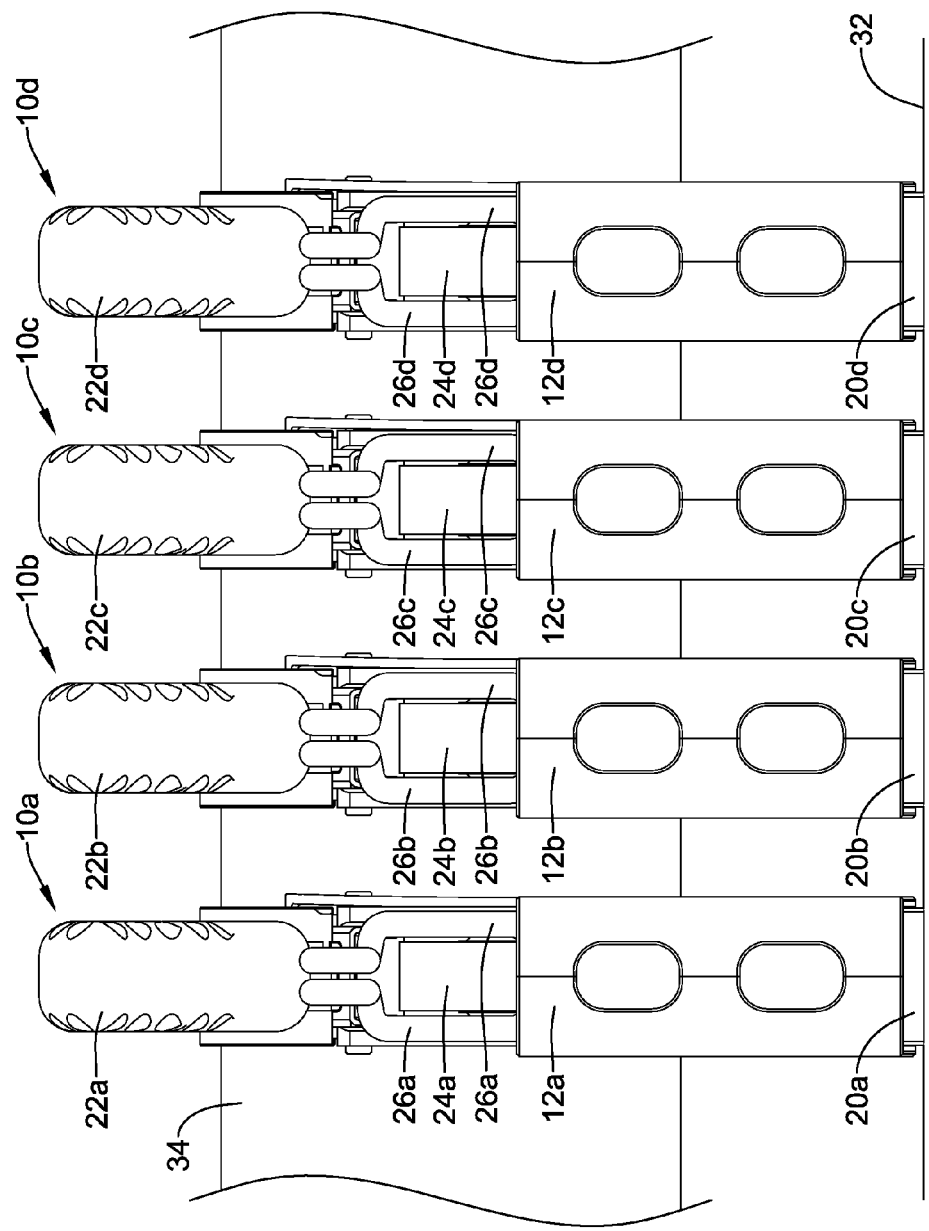

FIGS. 11A and 11B illustrate an exemplary bus of mounting blocks 30 (i.e., a plurality of mounting blocks 30 arranged in a series) mounted to a stationary member 34 of an electrical device. For example, the illustrated embodiment includes a first mounting block 30a, a second mounting block 30b, a third mounting 30c, and a fourth mounting block 30d mounted to a stationary member 34 of an electrical device. Each mounting block 30 of the electrical device and/or each mounting block 30 of every electrical device at a electrical facility, for example, may include a marker 60 having indicia 62 unique to that specific marker 60. For example, the indicia 62 of each marker 60 of the mounting blocks 30 used on an electrical device of an electrical facility may be different from and uniquely identifiable from the other markers 60. For example, the marker 60a of the first mounting block 30a may include a first unique indicia 62a, the marker 60b of the second mounting block 30b may include a second unique indicia 62b, the marker 60c of the third mounting block 30c may include a third unique indicia 62c, and the marker 60d of the fourth mounting block 30d may include a fourth unique indicia 62d, with each indicia 62a, 62b, 62c, 62d being different and uniquely identifiable from one another.

A marker 60 with a unique indicia 62 may be coupled to each of the mounting blocks 30 mounted on the electrical device. For example, when mounting the mounting blocks 30a, 30b, 30c, 30d to the stationary member 34, installing the brush holder assemblies 10 on the electrical device, performing maintenance on the electrical device, replacing brushes 20 on the brush holder assemblies 10, or at another desired time, a marker 60 may be coupled to the mounting block 30. In some instances, a technician installing the mounting blocks 30 on the electrical device, or performing maintenance on the electrical device, may have a container (e.g., a bag, box, etc.) of markers 60, and may arbitrarily or deliberately select one of the markers 60 from the container to couple to each of the mounting blocks 30 of the electrical device. Contemporaneously, the unique indicia 62 of the marker 60 may be recorded along with the position of the associated mounting block 30 on the electrical device. For example, the unique indicia 62 of the marker 60 may be inputted into a software program of a computer, scanned with a handheld scanner, logged into a notebook, or otherwise recorded, along with the position of the associated mounting block 30 on the electrical device. The unique indicia 62 and position of each mounting block 30 may thus be similarly recorded for the electrical device and/or electrical facility at which the electrical device is located. Thus, the location of a marker 60 having a specific unique indicia 62 (and thus the mounting block 30 associated with that marker 60) may be known. For example, the unique indicia 62a associated with the first mounting block 30a may be recorded as being at a first position on the electrical device, the unique indicia 62b associated with the second mounting block 30b may be recorded as being at a second position on the electrical device, the unique indicia 62c associated with the third mounting block 30c may be recorded as being at a third position on the electrical device, and the unique indicia 62d associated with the fourth mounting block 30d may be recorded as being at a fourth position on the electrical device, etc.

Thereafter, as shown in FIG. 11B, the brush holder assemblies 10 may be mounted onto the electrical device by mounting the brush holder assemblies 10 on the mounting blocks 30 secured to the stationary member 34. For example, a first brush holder assembly 10*a* may be mounted onto the first mounting block 30*a*, a second brush holder assembly 10*b* may be mounted onto the second mounting block 30*b*, a third brush holder assembly 10*c* may be mounted onto the third mounting block 30*c*, and a fourth brush holder assembly 10*d* may be mounted onto the fourth mounting block 30*d*, etc.

When the brush holder assemblies 10 are moved to the engaged position (such as shown in FIGS. 2 and 9) in which the electrical connection is established through the brush 20, terminal 28 and mounting block 30 to/from the electrically conductive surface 34, the marker 60 may mark the imprintable material layer 70 (e.g., leave an imprint or depression on the imprintable material layer 70) with a marking 80 corresponding to the indicia 62 of the marker 60.

At some later point in time, after the brush holder assembly 10 has been installed on the electrical device and used, such as when a brush 20 has worn sufficiently to warrant replacement, when an anomaly or threshold condition has occurred, or otherwise when maintenance needs to be performed on the electrical device, the brush holder assembly 10 and/or the brush 20 of the brush holder assembly 10 may be removed from the mounting block 30 and replaced with a new brush holder assembly 10 and/or brush 20. Accordingly, when the brush holder assembly 10 and/or the brush 20 are removed from the mounting block 30, and thus removed from the electrical device, the marking 80 on the imprintable material layer 70 (which may be attached to the terminal 28 of the brush 20) may indicate at which location on the electrical device the brush holder assembly 10 and/or the brush 20 were positioned and removed from. Namely, the marking 80 on the imprintable material layer 70 may indicate on which mounting block 30 the brush 20 and associated brush holder assembly 10 were mounted on. Thus, the marking 80 on the imprintable material layer 70 may be indicative of the location on electrical device the brush holder assembly 10 and/or brush 20 were positioned during use. For example, the marking 80 on the imprintable material layer 70 on the terminal 28 of the first brush 20*a* and associated first brush holder assembly 10*a* may indicate that the first brush 20*a* and first brush holder assembly 10*a* were mounted on the first mounting block 30*a* located at the first position on the electrical device, the marking 80 on the imprintable material layer 70 on the terminal 28 of the second brush 20*b* and associated second brush holder assembly 10*b* may indicate that the second brush 20*b* and second brush holder assembly 10*b* were mounted on the second mounting block 30*b* located at the second position on the electrical device, the marking 80 on the imprintable material layer 70 on the terminal 28 of the third brush 20*c* and associated third brush holder assembly 10*c* may indicate that the third brush 20*c* and third brush holder assembly 10*c* were mounted on the third mounting block 30*c* located at the third position on the electrical device, and the marking 80 on the imprintable material layer 70 on the terminal 28 of the fourth brush 20*d* and associated fourth brush holder assembly 10*d* may indicate that the fourth brush 20*d* and fourth brush holder assembly 10*d* were mounted on the fourth mounting block 30*d* located at the fourth position on the electrical device, etc.

Thus, the marking 80 on the imprintable material layer 70 may identify the position from which the brush holder assembly 10 and/or brush 20 were removed from. Accordingly, the used brush holder assembly 10 and/or brush 20 may be observed, inspected and/or analyzed upon removal from the electrical device, while knowing the position from which the brush holder assembly 10 and/or brush 20 was removed from the electrical device. For example, a technician may inspect and/or analyze the brush holder assembly 10 and/or brush 20 to determine if there has been abnormal brush wear, abnormal arcing, heating and/or discoloration, or other anomalous condition notable to the performance of the electrical device. If an abnormality is observed, the technician may check the recorded information to determine at which location the removed brush holder assembly 10 and/or brush 20 was removed from. Thus, the marking 80 on the imprintable material layer 70 may inform the technician to inspect a specific brush holder position on the electrical device.

Furthermore, based on records complied for each brush holder position of the electrical device, the technician may be able to determine previous dates that maintenance and/or replacement of a brush holder assembly 10 and/or brush 20 at a specific location on the electrical device occurred. Accordingly, the wear rate of the brush 20 may be determined, based on the duration of time the brush 20 was used, to determine if the actual wear rate of the brush 20 was within an acceptable range of an average or nominal wear rate. In the event that the actual wear rate of the brush 20 fell outside of the acceptable range, inspection of the electrical device may be initiated to determine if an abnormality is present and/or if maintenance or other remedial action is needed.

Those skilled in the art will recognize that aspects of the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method of monitoring a brush holder assembly, the method comprising:
   mounting a brush holder assembly at a position on an electrical generator, the position being one of a plurality of possible positions corresponding to one of a plurality of mounting members secured to a stationary structure of the electrical generator to which the brush holder assembly is mounted to;
   recording the position of the brush holder assembly in a computer;
   removing the brush holder assembly from the electrical generator after a brush of the brush holder assembly has worn; and
   inspecting the removed brush holder assembly to evaluate a condition of one or more components of the brush holder assembly.

2. The method of claim 1, further comprising:
   determining previous dates that maintenance was performed on a brush holder assembly at the position on the electrical generator.

3. The method of claim 1, further comprising:
   determining previous dates that brush replacement was performed on a brush holder assembly at the position on the electrical generator.

4. The method of claim 3, further comprising:
   determining a wear rate of the brush of the brush holder assembly removed from the electrical generator.

5. The method of claim 4, further comprising:
   determining if the wear rate of the brush of the brush holder assembly removed from the electrical generator falls within a nominal wear rate range.

6. The method of claim 5, further comprising:
initiating inspection of the electrical generator if the wear rate of the brush of the brush holder assembly removed from the electrical generator falls outside of the nominal wear rate range.

7. The method of claim 1, further comprising:
marking indicia on the brush holder assembly indicative of the position on the electrical generator from which the brush holder assembly was removed from.

8. The method of claim 7, wherein the brush holder assembly includes an imprintable material layer for receiving the indicia from a marker.

9. The method of claim 8, wherein the marker includes raised indicia and the indicia is a depression in the imprintable material layer.

10. The method of claim 8, wherein the indicia on the brush holder assembly is uniquely identifiable to the position on the electrical generator.

11. A method of monitoring a brush holder assembly, the method comprising:
mounting a first brush holder assembly at a position on an electrical generator, the position being one of a plurality of possible positions corresponding to one of a plurality of mounting members secured to a stationary structure of the electrical generator to which the first brush holder assembly is mounted to;
recording the position of the first brush holder assembly in a computer;
removing the first brush holder assembly from the electrical generator after a brush of the first brush holder assembly has worn;
mounting a second brush holder assembly at the position on the electrical generator after removing the first brush holder assembly;
removing the second brush holder assembly from the electrical generator after a brush of the second brush holder assembly has worn; and
comparing a wear rate of the brush of the second brush holder assembly to a wear rate of the brush of the first brush holder assembly.

12. The method of claim 11, wherein the wear rate of the brush of the first brush holder assembly is determined based on a duration of time the brush of the first brush holder assembly was in service on the electrical generator.

13. The method of claim 12, wherein the wear rate of the brush of the second brush holder assembly is determined based on a duration of time the brush of the second brush holder assembly was in service on the electrical generator.

14. The method of claim 13, further comprising:
determining if the wear rate of the brush of the second brush holder assembly removed from the electrical generator falls within a nominal wear rate range.

15. The method of claim 14, further comprising:
determining if the wear rate of the brush of the first brush holder assembly removed from the electrical generator falls within a nominal wear rate range.

* * * * *